United States Patent [19]

Shimomura

[11] 4,054,890
[45] Oct. 18, 1977

[54] EXPOSURE CONTROL DEVICE IN A CAMERA USING AN ELECTRO-OPTIC LIGHT CONTROL ELEMENT

[75] Inventor: Jun Shimomura, Tokyo, Japan

[73] Assignee: Nippon Kogaku K.K., Tokyo, Japan

[21] Appl. No.: 612,725

[22] Filed: Sept. 12, 1975

[30] Foreign Application Priority Data

Sept. 18, 1974 Japan .................... 49-107358

[51] Int. Cl.² .............................................. G03B 9/56
[52] U.S. Cl. .................................. 354/227; 354/23 D
[58] Field of Search ........................ 354/227, 23 D; 350/160 R, 160 LC

[56] References Cited

U.S. PATENT DOCUMENTS

| 3,476,029 | 11/1969 | Schreckendgust | 350/160 R |
| 3,890,628 | 6/1975 | Gurtler | 350/160 LC |
| 3,909,137 | 9/1975 | Kisanuki | 354/23 D |
| 3,928,858 | 12/1975 | Sakurada et al. | 354/23 D |

FOREIGN PATENT DOCUMENTS 2,157,001   7/1973   Germany ..................... 354/227

Primary Examiner—Russell E. Adams
Attorney, Agent, or Firm—Shapiro and Shapiro

[57] ABSTRACT

An exposure control device in a camera comprises light intercepting means disposed between a picture-taking lens and a film and in the light path of the picture taking lens and retractable out of the light path by operation of a shutter release member, electro-optic light control means disposed in the light path of the picture-taking lens and having its transmittivity to light variable by an electrical signal, and control means operable in response to the retracting movement of the light intercepting means out of the light path to apply a first signal to the light control means for increasing its transmittivity, apply a second signal to the light intercepting means for returning the same to the light path in order to terminate the exposure of the film to light, and apply a third signal to the light control means for decreasing it transmittivity to a minimum.

18 Claims, 16 Drawing Figures

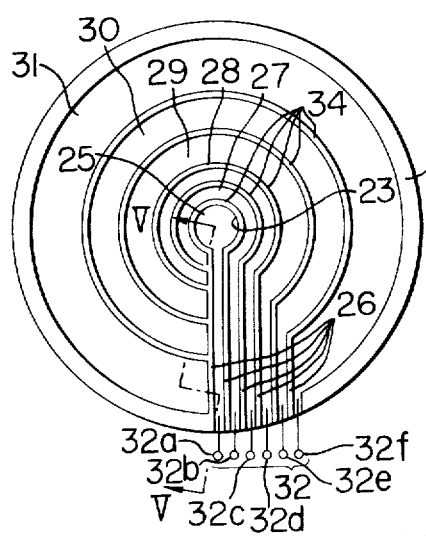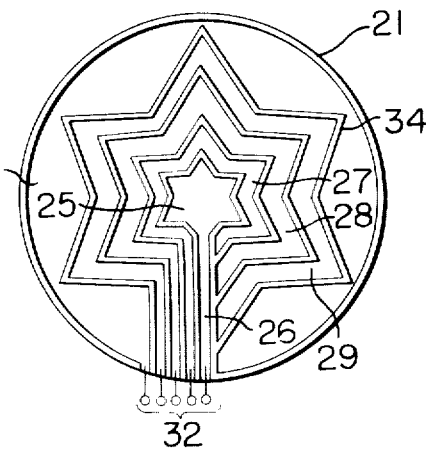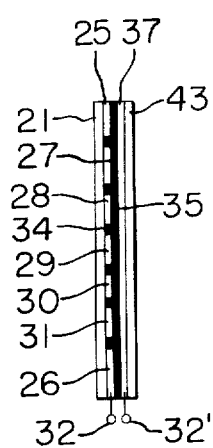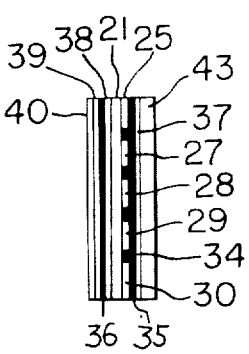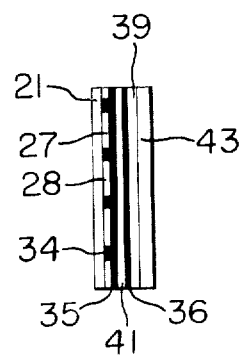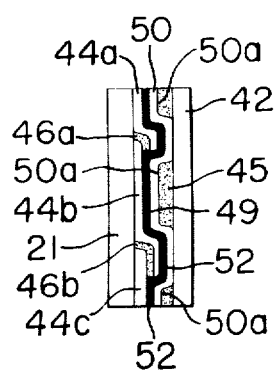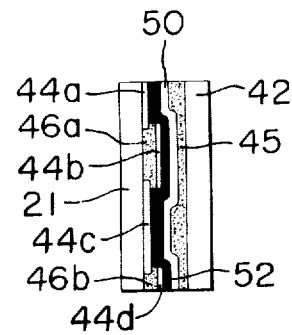

4,054,890

EXPOSURE CONTROL DEVICE IN A CAMERA USING AN ELECTRO-OPTIC LIGHT CONTROL ELEMENT

BACKGROUND OF THE INVENTION

1. Field of the Invention

This invention relates to an exposure control device in a camera using an electro-optic light control element whose transmittivity to light is variable by electrical signal.

2. Description of the Prior Art

There is a well-known idea of constructing means for controlling light, for example, a shutter, by applying an electric field to an electro-optic substance such as Kerr cell, single crystal, liquid crystal, suspension containing dipole molecules having a light-abosrbing characteristic, dielectric ceramics or electrochromic substance. However, a shutter using such an electro-optic substance permits passage of light therethrough to some extent even during the so-called intercepting condition, namely, the condition in which light must not be passed, and thus, it has been inferior in light intercepting performance to common shutters formed of metal plates or the like and accordingly, has been poor in utility as the light control means which is to be incorporated in ordinary cameras.

It is also known to construct a disphragm by applying a voltage to some of electrodes formed into a plurality of divided annular belts to thereby apply an electric field and form a predetermined configuration of opening (see Japanese Patent Publication No. 806/1969). Nevertheless, no concrete technique for applying the voltage to such electrodes has so far been proposed.

SUMMARY OF THE INVENTION

It is an object of the present invention to provide a camera exposure control device of simple construction using an electro-optic control element.

it is another object of the present invention to provide a highly efficient camera shutter using an electro-optic control element.

It is still another object of the present invention to provide a diaphragm device of simple construction using an electro-optic control element.

According to the present invention, there is provided an exposure control device in a camera which comprises light intercepting means disposed between a picture-taking lens and a film and in the light path of the picture-taking lens, the light intercepting means being retractable out of the light path by operation of a shutter release member, electro-optic light control means disposed in the light path of the picture-taking lens and having its transmittivity to light variable by an electrical signal, and control means operable in response to the retracting movement of the light intercepting means out of the light path to apply a first signal to the electro-optic light control means for increasing its transmittivity to light, apply a second signal to the light intercepting means for returning the same to its light intercepting position in order to terminate the exposure of the film to light, and apply a third signal to the electro-optic light control means for decreasing its transmittivity to light to a minimum.

These objects and other features of the present invention will become more fully apparent from the following detailed description of some embodiments of the invention taken in conjunction with the accompanying drawings.

BRIEF DESCRIPTION OF THE DRAWINGS

FIGS. 5A and 6 are plan views each showing a form of electrode portion of the light control element according to the present invention.

FIG. 5B is a cross-sectional view taken along the line V—V in FIG. 5A.

FIGS. 7 and 8 are partly cross-sectional views showing a form of the light control element according to the present invention.

FIGS. 9 and 10 are partly cross-sectional, enlarged views showing another form of the light control element according to the present invention.

DESCRIPTION OF THE PREFERRED EMBODIMENTS

Figure 1:
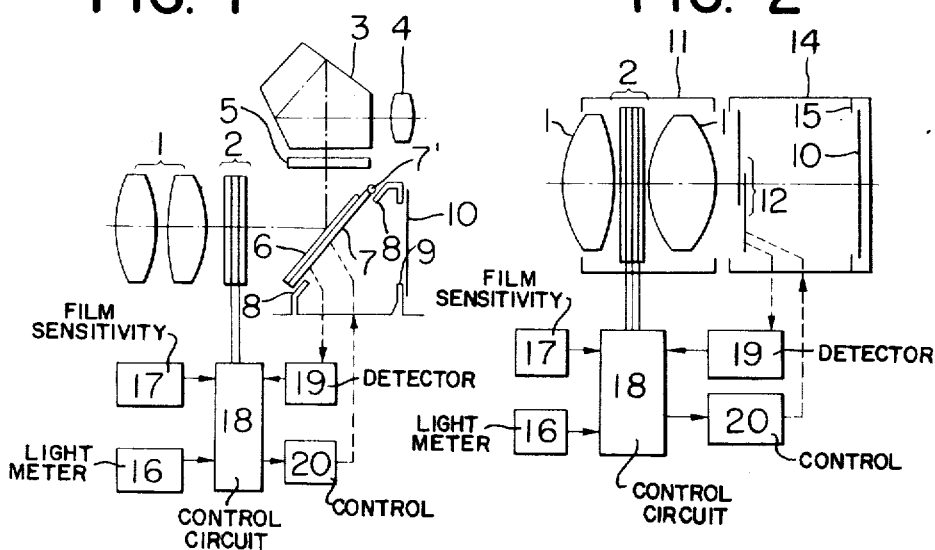
FIGS. 1 and 2 each illustrate an embodiment of the present invention.

Referring to FIG. 1, it shows an embodiment of the present invention as applied to a single lens reflex camera, in which a pentaprism 3, an eyepiece 4 and a focusing plate 5 together constitute a well-known optical viewfinder system. Provided behind an interchangeable objective lens 1 is electro-optic light control means 2 to constitute a "behind the lens shutter". A mirror 6 is supported on a support plate 7 formed of opaque material. The support plate 7 is of the well-known design, that is, pivotally mounted on a shaft 7' and clockwisely rotatable to retract out of the picture-taking light path to permit exposure. A fixed plate 8 is fixed to the camera body and cooperable with the support plate 7 to intercept the light to a film 10 which lies across a picture plane aperture portion 9 when the mirror is in its lowered position. The fixed plate 8 and the support plate 7 together constitute light intercepting means.

Figure 2:
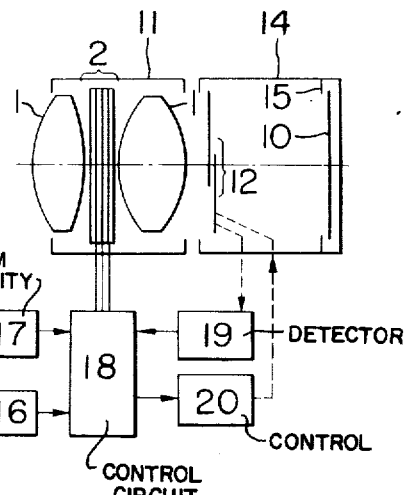

In an embodiment shown in FIG. 2, the electro-optic light control element 2 is disposed as a lens shutter and diaphragm between the lenses 1 within an interchangeable lens barrel 11, and in the portion which is adjacent to the camera body, two simple plates 12 formed of opaque material provide light intercepting means to the film 10 lying across a picture plane aperture portion 15, and also prevent unintended exposure of the film 10 to light when lens interchange is effected.

In both of FIGS. 1 and 2, the light control means 2 is connected to a control circuit 18 for electrically controlling the control means, and this control circuit 18 may receive the input from light metering means 16 for metering the brightness of an object to be photographed and the input from film sensitivity setting means 17. Light-intercepted condition detector means 19 may detect the position of the light-intercepting means 7 or 12, namely, whether or not the light intercepting means is intercepting the optical path of the lens 1, and may deliver the detection signal to the circuit 18. In response to the signal from the control circuit 18, light intercepting member control means 20 is operable to instruct the light intercepting means 7, 12 to start retraction from or return to the picture-taking optical path. The light-intercepted condition detector means 19 is designed such that, when it detects the retracting movement of the light intercepting means 7, 12 from the picture-taking light path, it operates the circuit 18 to increase the transmittivity of the light control means 2. Thereafter, the circuit 18 will provide the light control means 2 with a signal for decreasing the transmittivity of the light control means 2 back to its initial condition and provide the light intercepting member control means 20 with a signal for initiating the return of the light intercepting means 7, 12 to its initial position, thus returning the light intercepting means 7, 12 to its light intercepting position. In a single lens reflex camera of the bladed shutter type, the transmittivity of the light control element 2 is usually maintained at its maximum value, and the control circuit 18 once brings the transmittivity of the light control element 2 down to its minimum value, but after completion of the light intercepting resulting from the return of the light intercepting means 7, 12 succeeding the termination of a predetermined exposure, the control circuit 18 again maintains the transmittivity of the light control element at its maximum value.

Figure 3A:
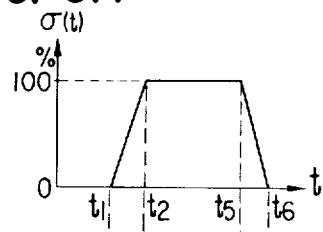
FIGS. 3A, 3B and 3C and 4A, 4B and 4C praphically illustrate the operation of the respective embodiments.

FIG. 3A shows the relation between time $t$ and the degree $\sigma(t)$ of retraction of the light intercepting means 7, 12 and it is seen that when $\sigma = 100\%$, the light intercepting means 7, 12 is completely outside the picture-taking light path and when $\sigma = 0\%$, the light intercepting means is completely in the light intercepting position.

In other words, $\sigma(t)$ may be said to represent the variation in quantity with time which is substantially proportionate to the intensity of the light incident onto the film surface which in turn is determined only by position of the light intercepting means 7, 12.

Figure 3B:
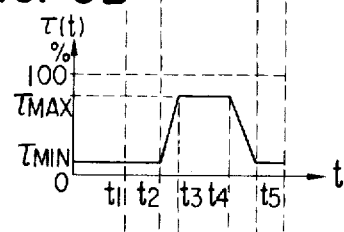

FIG. 3B shows the variation $\tau(t)$ with time in transmittivity of the light control element 2, and as is well-known, the transmittivity $\tau$ is at a level between the maximum $\tau_{max} < 100\%$ and the minimum $\tau_{min} > 0\%$ whatever electro-optic medium may be chosen.

Figure 3C:

FIG. 3C shows the variation $E(t)$ with time in intensity of illumination on the film surface, and the time integral thereof provides the exposure quantity.

Before the shutter release operation taken place, the light control element 2 passes therethrough light normally at the level of $\tau_{min}$ while the film surface 10 is shielded against the light by the light intercepting means 7, 12. When the shutter release operation takes place and the light intercepting means begins to retract from the picture-taking light path at a point of time $t_1$, a quantity of light substantially proportional to the product $\sigma(t) \times \tau_{min}$ will pass to the film surface till a point of time $t_2$ whereat the light intercepting means completes its retraction, since the light control element is passing therethrough a quantity of light $\tau_{min}$, and thus the intensity of illumination comes to assume $E_O$ at the point of time $t_2$. At this point of time $t_2$ when the light intercepting means 7, 12 has completely retracted from the picture-taking light path, the light-intercepted condition detector means 19 delivers a signal to the control circuit 18. With the aid of this signal, the control circuit 18 operates the light control means 2. Thereby, the transmittivity $\tau(t)$ begins to increase and reaches $\tau_{max}$ at a point of time $t_3$, as shown in FIG. 3B. At the same time, the intensity of illumination on the film surface assumes $E_1$ to permit a full-scale exposure to start, whereafter at a point of time $t_4$ determined by the output of the metering means 16 related to the brightness of the object and the output of the film sensitivity setting means 17 related to the film sensitivity, the control means 2 is caused by a signal from the control circuit 18 to decrease the transmittivity down from $\tau_{max}$ and reach $\tau_{min}$ at a point of time $t_5$. At the same time, the control circuit 18 delivers a signal to the light intercepting member control means 20 to return the light intercepting means 7, 12 from the position off the light path to the light intercepting position. In the meantime, the intensity of illumination $E(t)$ on the film surface is varied for decrease, as shown in FIG. 3C, following the course substantially converse to that between the points of time $t_1$ and $t_2$, and reaches zero at a point of time $t_6$, whereupon the exposure completes. If use is made of a commercially available electro-optic light control element with a maximum transmittivity of the order of $\tau_{max} = 60 - 80\%$, it will be possible for the minimum transmittivity to be $\tau_{min} = 0.1\%$ or less.

In a light control system using a polarizing plate, it is known that both $\tau_{max}$ and $\tau_{min}$ may assume smaller values because it has a greater absorption. Thus, in either case, the use of a conventional electro-optic element results in very low intensity of illumination on the film surface during the periods $t_1 - t_2$ and $t_5 - t_6$ and accordingly, the time integrals thereof are extremely small as compared with the total exposure amount. That is, $$\int_{t_1}^{t_2} E(t)dt << \int_{t_1}^{t_6} E(t)dt$$

and $$\int_{t_5}^{t_6} E(t)dt << \int_{t_1}^{t_6} E(t)dt$$

Therefore, if it is assumed that the time $t_2 - t_1$ or $t_6 - t_5$ required for the light intercepting means 7, 12 to completely retract from the light path or completely return to its initial position is of the order of between ten and several ms, it will be seen that the curve of $E(t)$ must be sharper in slope between $t_2 - t_3$ than between $t_2 - t_1$ because the time $t_3 - t_2$ is between and 0.1 and several ms even in liquid crystal which is relatively slow in response among various electro-optic light control elements. As is well-known, this corresponds to the fact that the curve shown in FIG. 3C results in an efficient exposure approximate to a rectangle. Thus, in a manner similar to the case of a bladed shutter, consider the following:

Exposure efficiency =
$$\frac{\text{Exposure amount during fully open condition}}{\text{Total exposure amount}} = \eta$$

The, calculate the exposure efficiency $$\eta = \frac{(t_4 - t_3)E_1}{\int_{t_1}^{t_6} E(t)dt}$$

with respect to the following example of numerical data:

$\tau_{max} = 70\%$ (value of the usually available electro-optic element)

$\tau_{min} = 0.1\%$

Therefore, $E_1 = 0.7$, $E_0 = 0.001$, and $E(t)$ is approximate to polygonal line and for convenience, it is assumed that as regards $E(t)$, rising and falling are both identical.

By using $t_2 - t_1 = t_6 - t_5 = 10$ ms . . . mechanical response time $t_3 - t_2 = t_5 - t_4 = 5$ ms . . . electro-optic response time $t_4 - t_3 = 4$ ms $= 1/250$ sec.

there is obtained:

$\eta = 44.3\%$

If, on the other hand, use is made only of mechanical light intercepting means having the same mechanical response time, there is no factor which is attributable to the electro-optic control element and in such case, the exposure efficiency may be obtained from the graph of FIG. 3A. More specifically, $t_2 - t_1 = t_6 - t_5 = 10$ ms $t_3 - t_2 = 4$ ms $= 1/250$ sec.

Hence, $\eta = 28.6\%$

As will be apparent from the comparison of this efficiency with the efficiency resulting from the use of the electro-optic control element, it is possible on the other hand to provide an efficient exposure while making the most of the characteristic of the electro-optic light control element and on the other hand, the demerit of the light control element in which $\tau_{min} = 0$ is impossible can be well overcome by combining such control element with the light intercepting means 7, 12 in the above-described manner.

Figure 4A:
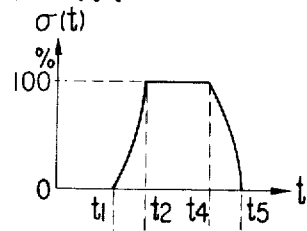
Figure 4B:
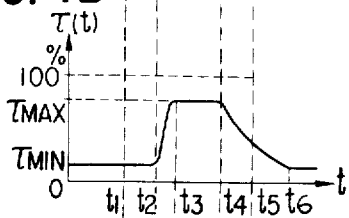
Figure 4C:
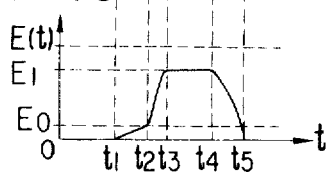

Next, FIG. 4 is a graphical representation of an embodiment which uses a light control element having a transmittivity characteristic $\tau(t)$ different from that shown in FIG. 3.

Some of electro-optic mediums take a longer time for falling than rising and have the falling time $t_6 - t_4$ amounting to several tens of ms which means a much slower response than that of a mechanical light intercepting means 7, 12. Even in the case where such an element is employed, the demerit of slow falling of the light control element 2 can be sufficiently cured because, if a signal is delivered from the control circuit 18 to the light intercepting member control means 20 to initiate the return to the initial position at the point of time $t_4$ whereat the exposure by the light control element 2 is completed, the light interception with respect to the film surface takes place within the time $t_5 - t_4$ required for the light intercepting means 7, 12 to effect the light interception, inasmuch as $t_5 - t_4 < t_6 - t_4$ in FIGS. 4A and 4B.

Also, the rising characteristic may be course be improved more appropriately in a system comprising a combination of the control circuit 18, the light intercepting member control means 20 and the light-intercepted condition detector means 19, by suitably setting their respective operating points. For example, if the rising characteristic is not good, it may be overcome by applying an electric field to the light control element 2 before the light intercepting member 7, 12 completes its retraction.

Further, if the object to be photographed is of so high brightness that proper exposure cannot be provided by the shortest exposure time and the smallest aperture diameter, it will be possible to vary the output of the circuit 18 in accordance with the output of the metering means 16 so that the transmittivity of the electro-optic light control element 2 may not reach its maximum value $\tau_{max}$ but be kept down to a lower value even during shutter release, thereby providing a proper exposure.

FIG. 5 shows an embodiment of the light control element 2. As shown in FIG. 5B which is a cross-sectional view taken along line V—V in FIG. 5A, the light control element comprises a transparent substrate 43, a common transparent electrode 37 leftwardly adjacent to the substrate, an electro-optic substance 35 leftwardly adjacent to the electrode, a plurality of transparent electrode pieces 25, 27, 28, 29, 30 and 31 leftwardly adjacent to the electro-optic substance and insulated from one another by insulators 34 as best seen in FIG. 5A, a lead-in electrode portion 26 for connecting the plurality of transparent electrode pieces to a group of external terminals 32, and a leftmost transparent substrate 21. The insulators 34 are made of the electro-optic substance 35. Further described, the electrode pieces 25, 27, 28, 29, 30 and 31 are respectively connected to the terminals 32a, 32b, 32c, 32d, 32e, and 32f by the lead-in electrode portion 26. The plurality of electrode pieces 25, 27, 28, 29, 30 and 31 are such that the belt-like electrode pieces 27, 28, 29, 30 and 31 sucessively surround the innermost circular electrode piece 25, with the areas of the belt-like electrode pieces substantially forming an aperture sequence (e.g. f2, 2.8, 4, 5.6, 8, 11). The common electrode 37 is connected to an external terminal 32' so that, when an electric field is to be applied to the substance 35 sandwiched between the electrode piece 25 and the common electrode 37, electrical signal may be applied to the terminals 32a and 32'.

The electro-optic substance 35 may be any one of various substances in liquid phase such as liquid crystal, a suspension containing dipole molecules having a light absorbing property, or in solid phase such as single crystal or dielectric ceramics, or substances like electrochromic substance which may be formed into both of a liquid layer and an evaporated film, or substances which may increase or decrease transmittivity to light with application of an electric field thereto. In the present invention, use may be made of any substance which will vary its transmittivity to light with application of electrical signal thereto.

In the present embodiment, such substance may act both as diaphragm and shutter in that it intercepts light over its entire area by no signal being applied to any of the external terminals 32a–32f respectively connected to the electrode pieces 25, 27, 28, 29, 30, 31 (the case where the substance 35 is of the type which increases its transmittivity to light with application of electrical signal) or by electrical signal being applied to all of the external terminals (the case where the substance 35 decreases its transmittivity to light with application of electrical field) and that the element passes light through only a portion of its entire area by electrical signal being applied to some of the external terminals 32a–32f and to the terminal 32'.

FIG. 6 shows an example of the electro-optic light control element in which the configuration of the electrode pieces 25, 27, 28, 29, 30 is modified.

The diaphragm according to this invention can intercept arbitrary optical rays, for example central rays, in the optical path of the objective, so that the diaphragm prevents reduced resolving power when the diaphragm is stopped down to minimum aperture value and prevents great reduction in quantity of marginal light of a wide-angle lens.

According to the construction of FIG. 5 or 6, simply by a voltage applied to each of the terminals connected to the transparent electrodes, the transmittivity of the portion corresponding to the pattern of the electrode can be controlled and therefore, in order to obtain the F/5.6 by stopping down a lens having maximum aperture value F/2.8, the transmittivity of any desired annular belt may be reduced so that the intensity of illumination on the film surface is reduced by 2EV. Thus, there are various combinations which may provide for the brightness of F/5.6 on the image plane, and in this case, it is only required to select such a combination of annular belts which will provide for an optimum optical performance with the aberration and OTF curve of the lens taken into account, and to control the transmittivity of such combination. This leads to a greatly improved quality of picture.

Since the light control element 2 may be operated simply by a voltage being applied to the terminals 32 and 32' in FIG. 5A and 5B or FIG. 6, control can be effected by a programme prepared by incorporating a suitable logic circuit in the control circuit 18 to thereby combine such factors as the magnitude of the applied voltage, the annular belts to which the voltage is applied, the order of voltage applications, the points of time for the voltage applications and the time during which the voltage is being applied, etc. with the input from the metering means 16, the input from the light-intercepted condition detector means 19, the output to the light intercepting member control means 20, etc.

Examples of the construction in which the shutter and the diaphragm are provided by discrete light control elements will be explained with reference to FIGS. 7 and 8. In FIG. 7, the shutter is formed by a pair of transparent electrodes 38, 39 provided between a common transparent substrate 21 and a transparent substrate 40, and an electro-optic substance 36 sandwiched between the electrodes, while the diaphragm is formed by a group of belt-like transparent electrodes 25, 27, 28, 29 and 30, a transparent electrode 37, an electro-optic substance 35 sandwiched between the group of electrodes and the transparent electrode 37, and the common substrate 21 and a transparent substrate 43. With the shutter and the diaphragm thus provided by discrete elements, electro-optic substances matching the characteristics of the shutter and the diaphragm may be chosen respectively. Further, if the substance 36 is solid, a transparent electrode 41 common to both substances may be used as shown in FIG. 8. Also, means such as a polarizer, analyzer or ¼ or ½ wavelength plate may be disposed before or behind or within the element.

In the embodiments shown in FIGS. 5 to 8, if the electro-optic substance 35 intervening between the insulating portion 34 and the common electrode is of the type which increases its transmittivity by a field applied thereto, no voltage will be applied to the intervening electro-optic substance 35 even when a voltage is applied between the group of electrode pieces and the common electrode, and therefore the intervening electro-optic substance will be left there in opaque condition to cause loss of light. If, conversely, the substance 35 is of the type which decreases its transmittivity by a field applied thereto, the intervening substance will remain transparent irrespective of the field applied thereto. Therefore, the light control element in said embodiments cannot completely perform the function as a shutter.

FIGS. 9 and 10 illustrate embodiments which overcome the abovenoted disadvantages. In FIG. 9, a common concavo-convex transparent electrode 50 is provided on a transparent substrate 42, and transparent insulating coating 45 is provided between each concave portion 50a of the electrode 50 and the substrate 42. A concavo-convex layer of electro-optic substance 52 lies on and along the common transparent electrode 50. Disposed adjacent to the substrate 52 is group of transparent electrode pieces 44a, 44b, 44c, adjacent ones of which are insulated from each other by insulating coatings 46a, 46b, but adjacent ones of the electrode pieces have portions thereof overlapping each other with the insulating coatings intervening therebetween. A transparent substrate 21 occupies the leftmost end.

In FIG. 10, the transparent substrate 42, the transparent insulating coating 45, the concavo-convex transparent common electrode 50 and the concavo-convex electro-optic substance layer 52 are substantially similar to those shown in FIG. 9. Annular belt-like transparent electrodes 44a, 44c are provided on the convex portions of the electro-optic substance 52, and similar transparent electrodes 44b, 44d are provided on the concave portions of the electro-optic substance 52. Transparent insulating coatings 46a, 46b are provided on the electrodes 44b, 44d. Again, adjacent electrodes 44a and 44b, 44b and 44c and 44d have portions thereof overlapping each other with the insulating coating 46a, 46b intervening therebetween. By these constructions, the layer thickness of the electro-optic substance 52 is made substantially constant and the spacing between the common electrode 50 and the group of electrodes 44a, 44b, 44c and 44d are also made substantially constant. Thus, if the substance 52 is of the type which increases its transmittivity by a field applied thereto, the entire area of the element may be made transparent by applying a voltage between the common electrode 50 and all of the electrodes 44a, 44b, 44c, 44d and if the substance 52 is of the type which decreases its transmittivity by a field applied thereto, the entire area of the element may be made opaque by application of a field.

In the above-described embodiments of the light control element, the patterned electrode determining the configuration of the stop opening is provided only on one side of the electro-optic substance and the common electrode is provided on the other side of the substance, but if the latter electrode on said other side is made into a patterned electrode, its combination with the other patterned electrode may form a diaphragm having a more sophisticated opening than that in the aforegoing embodiments.

Figure 11:
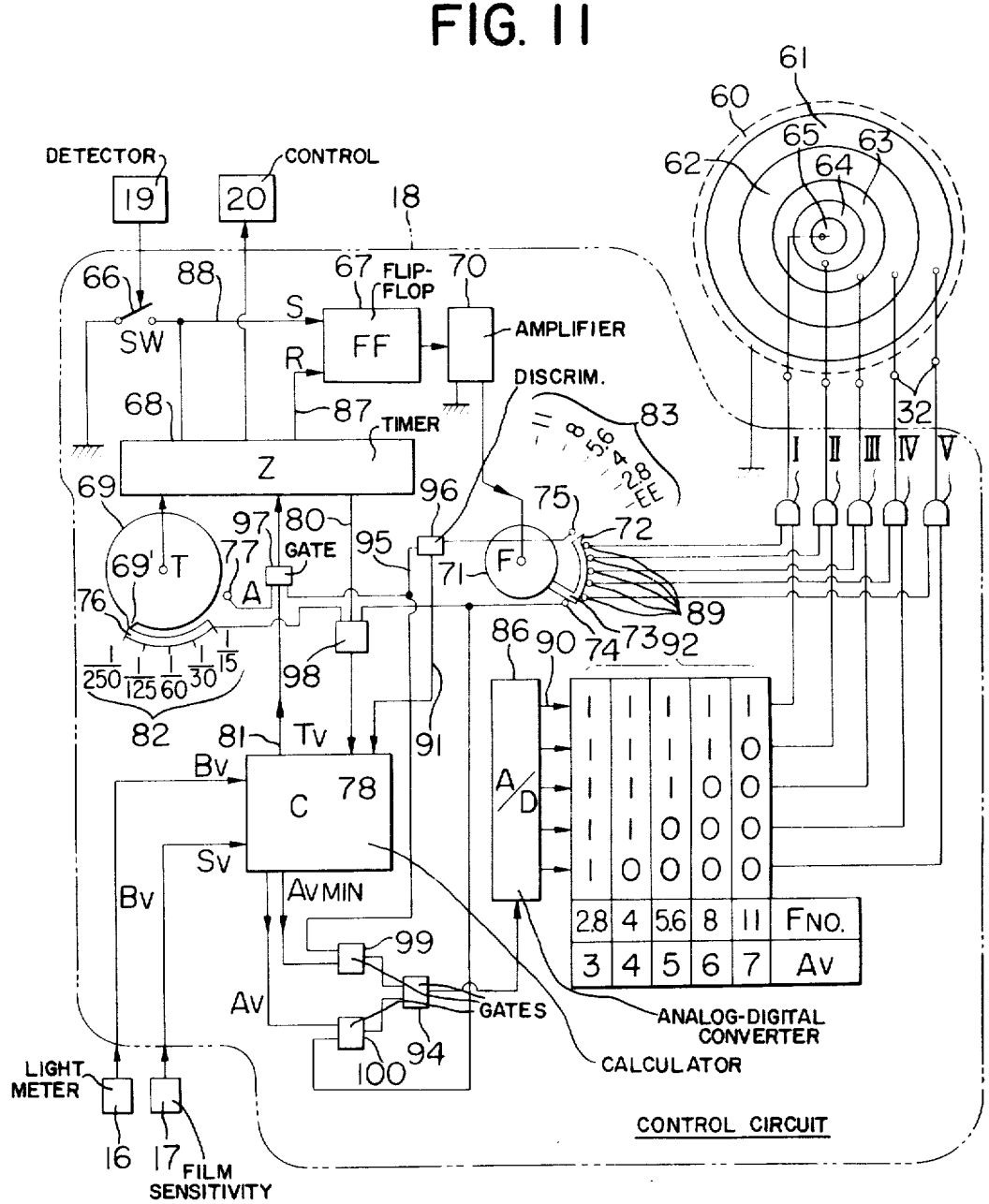
FIG. 11 illustrate the construction of the automatic exposure control device using the light control elements according to the present invention.

Description will now be made of the control circuit 18 in FIG. 1 or 2. FIG. 11 shows a full-auto exposure control device which employs the light control element 2 of the present invention acting both as diaphragm and shutter as shown in FIG. 9 or 10 and which is capable of switching over between shutter priority and diaphragm priority. In FIG. 11, the portion encircled by a dots-and-dash line corresponds to the control circuit 18 in FIG. 1 or 2.

In FIG. 11, the light control element shown in FIGS. 5 to 10 is simply represented by a common electrode 60 and a group of annular belt-like transparent electrode pieces 61–65 opposed thereto. Outputs from AND gates I, II, III, IV, and V are respectively connected to the transparent electrode pieces. It is to be understood that an electro-optic substance whose transmittivity reaches the maximum $\tau_{max}$ (hereinafter called the open state) by application of an electric field is used for each annular belt. One input of each of the AND gates I, II, III, IV and V is connected to the output of A flip-flop circuit 67 through a group of terminals 89, an aperture select switch 71 and an output amplifier 70. The flip-flop circuit 67 is such that it receives a set signal 88 when a switch 66 is closed by a signal from the light intercepted conditon detector means 19 representing the completion of the retraction of the light intercepting means 7, 12 of FIG. 1 or 2 and that it receives a reset signal 87 which is produced from a timer 68 after lapse of a predetermined time. Upon reception of the set signal, the output of the flip-flop circuit 67 is applied to the one input of each of the AND gates I, II, III, IV and V through an output amplifier 70, a switch 71, a slider piece 73 and a group of terminals 89. The signal produced by the timer 68 after the lapse of the predetermined time is also imparted to the light intercepting member control means 20. A shutter dial 69 is connected to the timer 68 so that the index mark 69′ on the shutter dial selects a shutter speed on a shutter speed scale 82, the timer 68 producing a time output signal after an exposure time corresponding to the selected shutter speed has elapsed from the time when the timer 68 has received a signal representing the closing of the switch 66. Through a gate circuit 97 which passes therethrough the signal from the output of an exposure calculating mechanism 78 only when terminals 75 and 77 are both in ON condition, the timer circuit 68 receives the output of the exposure calculating mechanism 78 which is in the form of time value Tv, and can also produce a time signal corresponding to such output. Further, the information on the selected exposure time may also be imparted from the shutter dial to the exposure calculating machanism 78 through the timer 68 and a gate circuit 98 which passes therethrough an output signal from the timer 68 only when both the terminal 74 and the collector plate 76 are in ON condition. This calculating mechanism 78 has the well-known function of calculating a proper aperture value from the information Tv on the exposure time, the information Bv from the metering means 16 on the brightness of the object to be photographed, and the information Sv from the film sensitivity setting means 17, and is designed to deliver the result of the calculation as signal Av to an A/D converter 86 through gate circuits 100 and 94. The gate circuit 100 passes therethrough the signal Av only when it receives the ON signal from the terminal 74. The gate circuit 94 is designed to pass therethrough only one of two inputs. Also, if the manually selected information on the aperture value is applied to the mechanism 78 from a line 91 as will hereinafter be described, the mechanism 78 may calculate a proper exposure time from such information and the information on the brightness of the object and the film sensitivity and deliver the result of the calculation as signal Tv to the timer 68 through the gate circuit 97. In addition, the calculating mechanism 78 is applying to a gate control circuit 99 the output of value $Av_{min}$ corresponding to the open aperture value. The gate circuit 99 is rendered conductive upon reception of a signal representing the closing of the terminal 75, namely, a signal indicating that the terminal 75 is connected to the slider piece 73, from the output terminal 95 of the signal discriminating circuit 96, and transmits the output of value $Av_{min}$ from the calculating mechanism 78 to the A/D converter 86 through the gate circuit 94.

The signal from the A/D converter 86 on the aperture value is divided into quantumized levels and applied through individual output terminals 90 thereof to the other input terminal of each of the AND gates I, II, III, IV and V. Now, the signal proportionate to the aperture value derived by the exposure calculating mechanism 78 (which signal may be regarded as being proportionate to the signal Av) is divided into quantumized levels by the A/D converter 86 and if Av=3, all inputs to the AND gates I-V will be ON(1) as shown in Table 92. That is, inputs from the A/D converter and the flip-flop 67 are applied to both input terminals of each AND gate so that a field is exerted on each annular belt, whereby the lens aperture becomes fully open and this is equivalent to Av3=F/2.8. When Av5=F/5.6, the field is exerted only on the annular belts connected to the AND gates I, II, and III and the annular belts 63, 64, 65 become transparent. The slider piece 73, which comprises concentric arcuate conductors, is integrally formed with the aperture select switch 71 and, when the index mark 72 thereon is registered with EE mark and with the division of open aperture value 2.8 adjacent to the EE mark, the slider piece is in electrical contact with all the input terminals 89 of the AND gates I-V. As the aperture select switch 71 is rotated counter-clockwise, the contacts between the slider piece 73 and the input terminals 89 may be broken away one by one from the AND gate V. The aperture scale 83 is in face-to-face-relationship with the movable index mark 72 and may indicate any selected aperture value upon manual operation. The terminal 75, connected to one input of each of gate circuits 97 and 99 through the signal descriminator circuit 96, is in contact with the slider piece 73 only when the slider piece has been set to manually adjusted condition, namely, when the index mark 72 faces any other aperture division 83 than the EE mark, thereby delivering to the gate circuits 97 and 99 a signal indicating that the aperture is in manually adjusted condition. The signal discriminating circuit 96 is connected to the exposure calculating mechanism 78 by the line 91 so as to feed back the manually set aperture value information to the exposure calculating mechanism 78 in the direction as indicated by the line 91. This is utilized in the exposure calculating mechanism 78 as the information for automatically calculating the shutter time which will later be described. On the other hand, the terminal 74 connected to one input of each of gate circuits 98 and 100 is in contact with the slider piece 73 when the aperture select switch 71 is registered with the EE mark as shown, thereby delivering to the gate circuits 98 and 100 a signal indicating that the aperture is in EE condition. The movable contact 69′ of the camera shutter dial 69 is normally in engagement with a collector piece 76 fixed to the camera body which provides one input terminal of the gate circuit 98, and may disengage from the collector piece 76 and engage a terminal 77 providing one input to the gate circuit 97 only when the shutter dial has been set to the position A for the automatic adjustment of the exposure time. The gate circuit 97 may pass therethrough an exposure time signal, produced from the exposure calculating mechanism 78, only in the direction of arrow 81 in which such signal is to be imparted to the timer 68, and the gate circuit 98 may pass therethrough an exposure time signal, produced from the timer 68, only in the direction of arrow 80 in which such signal is to be imparted to the exposure calculating mechanism.

Operation of the above-described automatic exposure control device will now be discussed.

1. EE operation in which a shutter time is preselected and aperture automatically controlled.

The aperture select switch 71 is first set to EE and an exposure time is set up by means of the shutter dial 69. With the operation of the unshown shutter button, the light intercepting means (7, 12 in FIG. 1) starts and closes the switch 66 operatively associated with the light-intercepted condition detector means 19, so that the timer 68 begins to count the preset exposure time while a set signal enters and closes the flip-flop circuit 67, whereby a voltage is applied from the output circuit 70 through the aperture select switch 71 and the slider piece 73 to one input terminal 89 of each of the AND gates I, II, III, IV and V. The information on the exposure time set by the timer 68 passes along a line 80 and through the gate circuit 98 into the exposure calculating mechanism 78. Since the slider piece 73 in EE position is in contact with the terminal 74, a signal representing the EE condition enters the gate circuits 98 and 100, and since the index mark 69' on the shutter dial 69 is in contact with the collector plate 76, a signal representing the manually set condition of the shutter dial also enters the gate circuit 98. Thus, the exposure time information from the timer 68 passes in the direction of arrow 80. The exposure time information from the timer 68, the object brightness information from the metering means 16 and the set film sensitivity information from the film sensitivity setting means 17 are all treated within the exposure calculating mechanism 78 in a known manner, and a value Av proportional to the logarithm of the aperture value providing for a proper exposure is imparted as the output of the mechanism 78 to the A/D converter 86 through the gate circuits 100 and 94. The aperture value output Av, divided into quantumized levels by the A/D converter 86, renders corresponding ones of the AND gates I-V into ON(1) state as indicated in Table 92 and thus, assuming that F/4 is the proper value, the AND gates I, II, III and IV only assume the ON(1) state, and therefor, since the group of terminals 89 are in ON position, the annular belts 62, 63, 64, 65 are rendered into open condition, thus permitting passage of light ($t_2$ in FIG. 3). Thus, fullscale exposure of the film is initiated. After lapse of an exposure time preselected by the dial 69, a reset signal is imparted from the timer 68 to the flip-flop circuit 67, whereby the output from the output circuit 70 is turned off to render the AND gates I-V into OFF condition and bring the annular belts into closed condition. The end-of-exposure signal from the timer 68 is also imparted to the light intercepting member control means 20, so that the light intercepting means 7, 12 returns into the picture-taking light path to complete the exposure. Preferably, the point of time at which the reset pulse R from the timer 68 is imparted to the flip-flop circuit 67 and the point of time at which the return signal is imparted to the light intercepting member control means 20 may be suitably set within the timer 68 with the falling characteristic of the electro-optic medium taken into account, as already described.

2. Operation in which aperture value is preselected and shutter time automatically controlled.

The shutter dial 69 is set to the position A (Auto), and the aperture select switch 71 is set to a predetermined aperture value. Thereupon, the movable contact 69' engages the terminal 77, whereby the gate circuit 97 is rendered into the condition of having been supplied with the Auto signal. On the other hand, a predetermined signal $Av_{min}$ normally produced by the exposure calculating mechanism 68 is passed to the A/D converter 86 through the gate circuit 99 which is then brought into ON condition by a signal representing the manually adjusted condition of the aperture, which comes on from the terminal 75 through the signal discriminating circuit 96. The associated operation of the light-intercepted condition detector means 19 after the operation of the shutter button is just identical with that in the case of the EE exposure described above, with the exception that one input of each of the AND gates I-V is in ON condition because the signal $Av_{min}$ comes from the A/D converter 86, while as to the other inputs of the AND gates, only those of the terminals 89 which are then in engagement with the slider piece 73 in accordance with the set position of the aperture select switch 71 aree rendered into ON condition. Thus, if the index mark 72 is ccaused to point at F/5.6, for example, it is only the AND gates I, II and III that are rendered into ON condition, so that in the light control element 2, only the annular belts 63, 64, 65 are open to provide for a predetermined aperture value. Thus, full-scale exposure of the film to light is initiated ($t_2$ in FIG. 3). The preselected aperture value is fed back as aperture value input to the exposure calculating mechanism 78 along the line 91 and through the slider piece 73, the terminal 75 and the signal discriminating circuit 96, and within thee mechanism 78 the time value Tv corresponding to the logarithm of the proper exposure time is calculated from the applied aperture value, the object brightness and the film sensitivity, whereafter an instruction is imparted to the timer 68 through a line 81. Count of the exposure time by this timer 68 is initiated in response to the closing of the switch 66, as previously described. Since the terminal 74 and the slider plate 73 are now out of engagement, the gate circuit 98 does not pass the output of the timer 68 and the line 80 is in disconnected condition. After lapse of the exposure time, the timer 68 delivers a reset signal R to the flip-flop circuit 67 and thus, the output circuit 70 renders all the AND gates into OFF condition. In this manner, the main exposure by the light control element 2 is terminated ($t_4$ in FIG. 3). The function of instructing the light intercepting member control means 20 to return to the initial position is very much the same as that described previously.

3. Manual Exposure.

When manual exposure is to be provided, the shutter dial 69 and the aperture select switch 71 are both set to any other desired position than A and EE and therefore, neither of the two gate circuits 97, 98 passes any information therethrough and the exposure time of the shutter dial is only singly imparted to the timer. On the other hand, the signal $Av_{min}$ is produced from the exposure calculating mechanism 78 and passed through the gate circuit 99 to the gate circuit 94, from which the signal is further passed through the A/D converter 86 to cause the exposure to be effected at the manually selected aperture just in the same manner as in the case of the automatic exposure at the shutter time.

4. In the case where the aperture select switch 71 is set to EE and the shutter dial 69 to A, both shutter time and aperture value logically become indefinite, but according to the present invention, the gate circuits 97 and 98 are both in OFF condition, so that no give and take of information occurs between the timer 68 and the exposure calculating mechanism 78 and Av is not calculated nor the time signal corresponding to shutter time is produced and therefore, the gate circuit 100 is reduced to OFF condition while the gate circuit 99 is also rendered to OFF condition because the terminal 75 is opened. Thus, the signal $Av_{min}$ does not enter the gate circuit 94 and no input is applied to this gate circuit 94, which means no signal applied to the A/D converter, and no exposure occurs with the aperture remaining closed.

In the application of the invention illustrated in FIG. 11, the light control element has been shown to serve as shutter and diaphgram, whereas discrete light control element may be used as shutter and diaphragm, respectively, as shown in FIGS. 7 and 8.

In the latter case, if use is made of electro-optic elements which will be made transparent by application of a field, the electro-optic control element serving as diaphragm will be connected in the same manner as that shown in FIG. 11 and the electro-optic element serving as shutter may be arranged such that it has a field applied thereto in response to closing of the switch 66 and has the field removed therefrom by the reset signal R from the timer 68. In such case, however, the portion 34 of FIG. 7 having no electrode attached thereto will always pass light therethrough and with the presence of such portion taken into account, the size and shape of the aperture opening should be determined.

By so combining the light control elements of the present invention with the control circuit 18 of the present invention having the above-described logical function, there may simply be constructed an automatic exposure control device which enables both shutter priority and aperture priority to be accomplished simply by dial selection and also can effect manual exposure control.

Further, in the present embodiment, both the aperture value in the case where shutter time is manually preselected and the shutter time in the case where aperture value is manually preselected are determined by a single common calculating mechanism 78, whereas two calculating mechanisms may be provided to perform the respective functions.

The effects of the present invention may be summarized as follows:

1. Light control elements comprising an electro-optic substance (such as liquid crystal, signal crystal, suspension containing dipole molecules having a light absorbing characteristic, dielectric ceramics or the like) whose minimum transmittivity $\tau_{min}$ are not always sufficient in light intercepting performance as compared with conventional mechanical shutters can be put into practical use with ordinary amateur cameras as well.

2. The light control elements constructed according to the present invention are especially suitable for use as an interlens shutter or as a behind the lens shutter and diaphragm or as a shutter and diaphragm and can thus control the transmittivity at any location within the aperture opening at various levels and in any desired order, thus enabling the light passing through the annular belt portion having much aberration to be suitably attenuated to thereby improve the sharpness of the picture image. Further, control of the exposure amount in the image plane does not presuppose the need for the small aperture as was usual with conventional diaphragm of metal plate and this leads to the provision of an optical system which is free of reduction in resolving power and reduction in accuracy of the exposure amount during small aperture photography.

3. The conventional automatic aperture control (EE) has always involved mechanically movable members which must be properly stopped at a predetermined position, whereas the present invention has no moving portion and the information on aperture control is completely quantumized, thus enabling the aperture control to be performed purely digitally and highly accurately.

4. By the complete quantumization of the automatic aperture control, it becomes possible to use a relatively simple logic circuit to construct an automatic exposure control device which permits the photographer to select any of shutter time priority and aperture priority by the use of a switch, as he desires.

I claim:

1. An exposure control device in a camera comprising:
   1. light intercepting means disposed between a picture-taking lens and a film and in the light path of said picture-taking lens, said light intercepting means being retractable out of said light path by operation of a shutter release member;
   2. electro-optic light control means disposed in said light path of said picture-taking lens and having its transmittivity to light variable by an electrical signal; and
   3. control means including means for applying to said electro-optic light control means a first signal which causes the light transmittivity of said electro-optic light control means to reach a maximum at about a point of time close to that whereat the retraction of said light intercepting means out of said light path is completed, means for applying to said electro-optic light control means a second signal which decreases said light transmittivity, and means dependent upon the timing of said second signal for applying to said light intercepting means a third signal which consistently returns the same to its intercepting position automatically so as to terminate the exposure of said film to light at about a point of time close to that whereat the light transmitivity of said electro-optic light control means reaches the minimum.

2. An exposure control device according to claim 1, wherein said control means includes means for manually presetting exposure time and a timer circuit for determining the points of time at which said second and said third signal are produced in accordance with the output of said manual exposure time setting means.

3. An exposure control device according to claim 2, further comprising an exposure factor introducing circuit for producing an output corresponding to the brightness of an object to be photographed and the film sensitivity, and wherein said control means includes:
   means for manually presetting aperture value;
   a first exposure calculating circuit for calculating a proper exposure time in accordance with the output of said manual aperture value setting means and the output of said exposure factor introducing circuit and for producing an output corresponding to the proper exposure time; and
   selector means for selectively supplying the output of said manual exposure time setting circuit and the output of said exposure calculating circuit to said timer circuit.

4. An exposure control device according to claim 3, wherein said electro-optic light control means includes an electro-optic substance and a pair of transparent electrode disposed on the opposite sides of said substance to apply an electric field thereto, at least one of said pair of electrodes comprising a plurality of electrode pieces electrically insulated from one another.

5. An exposure control device according to claim 3, wherein said electro-optic light control means includes a first electro-optic light control element acting as a shutter comprising and electro-optic substance and a pair of transparent electrodes disposed on the opposite sides of said substance, and a second electro-optic light control element acting as a diaphragm comprising an electro-optic substance and a pair of transparent electrodes disposed on the opposite sides of said substance to apply an electric field thereto, at least one of said pair of electrodes of said second element comprising a plurality of electrodes pieces electrically insulated from one another.

6. An exposurre control device according to claim 4, wherein said electro-optic light control element further includes transparent insulators disposed between adjacent ones of said plurality of electrode pieces, said adjacent electrode pieces overlapping each other in the direction of travel of the light passed through the picture-taking lens, with said insulators intervening therebetween.

7. An exposure control device according to claim 6, wherein said electro-optic substance of said electro-optic light control element is formed in a predetermined concavo-convex configuration in the direction of said optical axis.

8. An exposure control device according to claim 5, wherein said second electro-optic light control element further includes transparent insulators disposed between adjacent one of said plurality of electrode pieces, said adjacent electrode pieces overlapping each other in the direction of travel of the light passed through the picure-taking lens, with said insulators intervening therebetween.

9. An exposure control device according to claim 8, wherein said electro-optic substance of said second electro-optic light control element is formed in a predetermined concavo-convex configuration in the direction of said optical axis.

10. An exposure control device according to claim 4, wherein said control means includes:
a second exposure calculating circuit for calculating a proper aperture value from the output of said manual exposure time setting means and the output of said exposure factor introducing circuit and for producing an output corresponding to the proper aperture value;
an electrical signal applying circuit including an analog-digital converter circuit for quantumizing the output of said second exposure calculating circuit, said signal applying circuit applying between said pair of electrodes the output of said calculating circuit quantumized by said converter circuit, said analog-digital converter circuit having a plurality of output terminals respectively connected to said plurality of electrode pieces;
detector means for detecting the retracting movement of said light intercepting means out of said light path to produce an output; and
a switching circuit connected to said detector means and said timer circuit, said switching circuit permitting said electrical signal applying circuit to apply the output between said electrodes from reception of said output of said detector means till reception of said third signal of said timer circuit.

11. An exposure control device according to claim 10, wherein said switching circuit includes:
AND gate circuits equal in number to said plurality of electrode pieces, the output terminals of said gate circuits being respectively connected to said electrode pieces and one input of each of said gate circuits being connected to the output terminals of said analog-digiatl converter circuit; and
a circuit having the output terminal thereof connected to the other input terminal of each of said AND gate circuits, said circuit being operable to apply an operating signal to each of said AND gate circuits from reception of the output of said detector means till reception of said third signal of said timer circuit.

12. An exposure control device according to claim 11, wherein said manual aperture value setting means is connected between said operating signal applying circuit and said AND gate circuits and has terminals respectively connected to said other input terminals of said AND gate circuits, and when having selected an aperture value, said manual aperture value setting means applies the operating signal of said operating signal applying circuit to said terminals which correspond to said selected aperture value.

13. An exposure control device according to claim 12, wherein said manual aperture value setting means can change over between automatic aperture value setting and manual aperture value setting and applies said operating signal to all of the terminals of said manual aperture value setting means in the automatic aperture value setting.

14. An exposure control device according to claim 1 wherein said light intercepting means includes a reflecting mirror movable between an upper position in which said mirror is retracted from said light path and a lower position in which said mirror reflects the light passed through said phototaking lens toward a view finder system, and a shielding member fixed in the camera body for cooperating with said reflecting mirror in the lower position to intercept the light to the film.

15. An exposure control device in a camera comprising:
1. electro-optic light control means disposed between a picture-taking lens and a film in the light path of said picturing-taking lens and divided into a plurality of zones, each zone being opened to light by an electrical signal to serve as a diaphragm;
2. AND gates equal in number to said plurality of zones, ech of said AND gates having first and second input terminals and having an output terminal which is connected to a respective one of said zones to apply an electrical signal thereto;
3. manual setting means for manually setting an aperture value, said manual setting means being connected to said first input terminals of said AND gates to apply an electrical signal thereto selectively accordingly to the manually set aperture value;
4. automatic control means for automatically controlling a proper aperture value, said automatic control means being connected to said first input terminals of said AND gates to apply an electrical signal to all the first input terminals said automatic control means and said manual setting means being selectively operated;

5. digital means having output terminals equal in number to said AND gates, each of said output terminals of said digital means being connected to a respective one of said second input terminals of said AND gates, said digital means generating an electrical signal at certain output terminals of said digital means accordingly to a proper aperture value determined in accordance with exposure factors when said automatic control means is operated, and generating an electrical signal at all the output terminals of said digital means when said manual setting means is operated.

16. An exposure control device according to claim 15 further comprising an exposure factor introducing circuit for producing an output corresponding to the brightness of an object to be photographed and the film sensitivity and the exposure time, and wherein said digital means includes an exposure calculating circuit for calculating a proper aperture value in accordance with the output of said exposure factor introducing circuit when said automatic control means is operated and a minimum aperture value when said manual setting means is operated and an analog-digital converter circuit for quantumizing the output of said exposure calculating circuit, said converter circuit having output terminals which serve as the output terminals of said digital means.

17. An exposure control device according to claim 16, wherein said electro-optic light control means includes an electro-optic substance, a pair of transparent electrode disposed on the opposite sides of said substance to apply an electrical signal thereto, at least one of said electrodes being formed with a plurality of electrode pieces, and transparent insulators disposed between adjacent ones of said plurality of electrodes pieces, said adjacent electrode pieces overlapping each other in the direction of travel of the light passed through the picture-taking lens, with said insulators intervening therebetween.

18. An exposure control device according to claim 17, wherein said electro-optic substance is formed in a predetermined concave-convex configuration in the direction of the optical axis.

* * * * *